(12) United States Patent
Yamane et al.

(10) Patent No.: US 11,473,172 B2
(45) Date of Patent: Oct. 18, 2022

(54) WEAR-RESISTANT COPPER-ZINC ALLOY AND MECHANICAL DEVICE USING SAME

(71) Applicants: IHI Corporation, Tokyo (JP); Miyoshi Gokin Kogyo Co., Ltd., Saitama (JP)

(72) Inventors: Masaaki Yamane, Tokyo (JP); Hayao Eguchi, Tokyo (JP); Masato Arai, Tokyo (JP); Yuta Arai, Tokyo (JP); Mutsuki Ishijima, Tokyo (JP); Hideharu Ito, Tokyo (JP); Yoshihito Ogasawara, Tokyo (JP); Shintaro Fujii, Tokyo (JP); Genjiro Hagino, Tokyo (JP)

(73) Assignees: IHI CORPORATION, Tokyo (JP); MIYOSHI GOKIN KOGYO CO., LTD., Saitama (JP)

( * ) Notice: Subject to any disclaimer, the term of this patent is extended or adjusted under 35 U.S.C. 154(b) by 200 days.

(21) Appl. No.: 16/554,749

(22) Filed: Aug. 29, 2019

(65) Prior Publication Data
US 2019/0390302 A1 Dec. 26, 2019

Related U.S. Application Data

(63) Continuation of application No. PCT/JP2018/011817, filed on Mar. 23, 2018.

(30) Foreign Application Priority Data

Mar. 24, 2017 (JP) .............................. JP2017-059926

(51) Int. Cl.
*C22C 9/04* (2006.01)
*F16C 33/12* (2006.01)
*C22F 1/08* (2006.01)

(52) U.S. Cl.
CPC .............. *C22C 9/04* (2013.01); *F16C 33/121* (2013.01); *C22F 1/08* (2013.01)

(58) Field of Classification Search
CPC ........................................................ C22C 9/04
See application file for complete search history.

(56) References Cited

U.S. PATENT DOCUMENTS 4,249,942 A * 2/1981 Shapiro ..................... C22C 9/04
420/480
5,137,685 A 8/1992 McDevitt et al.
(Continued)

FOREIGN PATENT DOCUMENTS

AT 247098 B 5/1966
AT 505290 A4 12/2008
(Continued)

OTHER PUBLICATIONS

Qiu Guang-bin, "Effects of Alloying Elements on the Properties of Free-cutting Nonleaded Brass", Shanghai Nonferrous Metals, vol. 32, No. 4, pp. 156-161 (Dec. 15, 2011).
(Continued)

*Primary Examiner* — Anthony J Zimmer
*Assistant Examiner* — Jacob J Gusewelle
(74) *Attorney, Agent, or Firm* — Volpe Koenig

(57) ABSTRACT

A wear-resistant copper-zinc alloy includes in mass %, 28 to 55% Zn, 0.5 to 2% P, and a balance of Cu and unavoidable impurities, and the wear-resistant copper-zinc alloy has an electrical conductivity of 10 to 33% IACS and a hardness of 3.6[Zn]-55 HBW or more, where [Zn] denotes the Zn content in mass %. Alternatively, a wear-resistant copper-zinc alloy includes in mass %, 40 to 55% Zn, 1 to 6% Mn, and a balance of Cu and unavoidable impurities, and the wear-resistant copper-zinc alloy has an electrical conductiv-
(Continued)

ity of 10 to 33% IACS and a hardness of 3.6[Zn]-55 HBW or more, where [Zn] denotes the Zn content in mass %.

1 Claim, 5 Drawing Sheets

(56) References Cited

U.S. PATENT DOCUMENTS

| | | | |
|---|---|---|---|
| 6,040,067 | A | 3/2000 | Sugawara et al. |
| 6,458,222 | B1 | 10/2002 | Matsubara et al. |
| 6,475,635 | B1 | 11/2002 | Sakai et al. |
| 8,623,518 | B2 | 1/2014 | Tujimoto et al. |
| 9,434,005 | B2 | 9/2016 | Yakota et al. |
| 10,533,244 | B2 | 1/2020 | Hanaoka et al. |
| 10,760,146 | B2 | 9/2020 | Kido et al. |
| 2003/0026715 | A1 | 2/2003 | Ojima et al. |
| 2006/0199034 | A1 | 9/2006 | Mergen |
| 2008/0202653 | A1* | 8/2008 | Ignberg ............ C22C 9/04 148/680 |
| 2010/0098579 | A1* | 4/2010 | Xu ............ C22C 9/04 420/478 |
| 2010/0284852 | A1 | 11/2010 | Cross |
| 2011/0129173 | A1 | 6/2011 | Yakota et al. |
| 2011/0211781 | A1 | 9/2011 | Toda et al. |
| 2012/0251375 | A1 | 10/2012 | Yakota et al. |
| 2013/0052480 | A1 | 2/2013 | Tujimoto et al. |
| 2013/0056116 | A1* | 3/2013 | Ito ............ H01B 1/026 148/684 |
| 2013/0115128 | A1* | 5/2013 | Lawrence ............ C22F 1/08 420/478 |
| 2013/0216169 | A1 | 8/2013 | Zidar |
| 2014/0166164 | A1 | 6/2014 | Oishi et al. |
| 2014/0193292 | A1 | 7/2014 | Oishi et al. |
| 2015/0165519 | A1 | 6/2015 | Aufrecht et al. |
| 2015/0218674 | A1 | 8/2015 | Kido et al. |
| 2016/0102386 | A1 | 4/2016 | Schmitt et al. |
| 2017/0211169 | A1 | 7/2017 | Hanaoka et al. |
| 2019/0093195 | A1 | 3/2019 | Gummert et al. |

FOREIGN PATENT DOCUMENTS

| | | |
|---|---|---|
| AT | 509867 A4 | 12/2011 |
| CN | 1373234 A | 10/2002 |
| CN | 1263876 C | 7/2006 |
| CN | 100378235 C | 4/2008 |
| CN | 100387739 C | 5/2008 |
| CN | 100389217 C | 5/2008 |
| CN | 100389218 C | 5/2008 |
| CN | 101688268 A | 3/2010 |
| CN | 102230103 A | 11/2011 |
| CN | 102230104 A | 11/2011 |
| CN | 102828063 A | 12/2012 |
| CN | 103042318 A | 4/2013 |
| CN | 103045899 A | 4/2013 |
| CN | 103045900 A | 4/2013 |
| CN | 103045901 A | 4/2013 |
| CN | 103056552 A | 4/2013 |
| CN | 103060605 A | 4/2013 |
| CN | 103555994 A | 2/2014 |
| CN | 103757466 A | 4/2014 |
| CN | 103757467 A | 4/2014 |
| CN | 103757468 A | 4/2014 |
| CN | 104284990 A | 1/2015 |
| CN | 104294082 A | 1/2015 |
| CN | 105039777 A | 11/2015 |
| CN | 105088115 A * | 11/2015 |
| CN | 106460135 A | 2/2017 |
| DE | 202016102696 U1 | 10/2017 |
| EP | 0947592 A1 | 10/1999 |
| EP | 1270758 A2 | 1/2003 |
| EP | 2573198 A1 | 3/2013 |
| EP | 3147382 A1 | 3/2017 |
| JP | 63-290231 A | 11/1988 |
| JP | 10-183275 A | 7/1998 |
| JP | 2000-192175 A | 7/2000 |
| JP | 2000-345255 A | 12/2000 |
| JP | 2001-164328 A | 6/2001 |
| JP | 2001-241445 A | 9/2001 |
| JP | 2002-256362 A | 9/2002 |
| JP | 2002-285263 A | 10/2002 |
| JP | 2002-349572 A | 12/2002 |
| JP | 2002-349573 A | 12/2002 |
| JP | 2003-073759 A | 3/2003 |
| JP | 2003-147459 A | 5/2003 |
| JP | 2003-268514 A | 9/2003 |
| JP | 2004-285449 A | 10/2004 |
| JP | 3718147 B2 | 11/2005 |
| JP | 2006-188722 A | 7/2006 |
| JP | 2006-242386 A | 9/2006 |
| JP | 2006-283060 A | 10/2006 |
| JP | 2007-270214 A | 10/2007 |
| JP | 2008-007839 A | 1/2008 |
| JP | 1100583 B2 | 6/2008 |
| JP | 2009-013487 A | 1/2009 |
| JP | 2009-062610 A | 3/2009 |
| JP | 2009-079270 A | 4/2009 |
| JP | 2010-242121 A | 10/2010 |
| JP | 2010227964 A * | 10/2010 |
| JP | 2013-108122 A | 6/2013 |
| JP | 5253440 B2 | 7/2013 |
| JP | 2013-204109 A | 10/2013 |
| JP | 2014-208861 A | 11/2014 |
| JP | 57-070247 A | 8/2015 |
| JP | 2015-527487 A | 9/2015 |
| JP | 2016-524652 A | 8/2016 |
| JP | 2016-164311 A | 9/2016 |
| WO | 98/10106 A1 | 3/1998 |
| WO | 99/24628 A1 | 5/1999 |
| WO | 2008/001852 A1 | 1/2008 |
| WO | 2010/113749 A1 | 10/2010 |
| WO | 2011/155648 A1 | 12/2011 |
| WO | 2013/042678 A1 | 3/2013 |
| WO | 2014/043837 A1 | 3/2014 |
| WO | 2015/166998 A1 | 5/2015 |
| WO | 2016/177018 A1 | 11/2016 |
| WO | 2017/198698 A1 | 11/2017 |

OTHER PUBLICATIONS

Decision to Grant dated Apr. 28, 2021 for Chinese Patent Application No. 201880018461.8.
Chinese Office Action dated Dec. 1, 2020 for Chinese Patent Application No. 201880018461.8.
German Office Action dated Apr. 15, 2020 for German Patent Application No. 112018001576.9.

* cited by examiner

FIG. 1

| No. | COMPONENT SYSTEM | COMPONENT COMPOSITION (MASS%) | | | | | ELECTRICAL CONDUCTIVITY (%IACS) | HARDNESS (HBW 10/500) | FORMULA 1 | SPECIFIC WEAR AMOUNT (mm²/kgf) | STRUCTURE |
|---|---|---|---|---|---|---|---|---|---|---|---|
| | | Zn | P | Mn | Sn | Cu | | | | | |
| 1 | Cu-30Zn | 29.8 | – | – | – | Bal. | 29 | 55 | 52 | 4.40E-07 | α |
| 2 | Cu-40Zn | 38.9 | – | – | – | Bal. | 29 | 86 | 85 | 7.00E-07 | α+β |
| 3 | Cu-45Zn | 44.6 | – | – | – | Bal. | 34 | 100 | 106 | 5.20E-07 | β |
| 4 | Cu-52Zn | 51.4 | – | – | – | Bal. | 39 | 136 | 130 | 4.40E-07 | β+γ |
| 5 | Cu-30Zn-1P | 32.7 | 0.92 | – | – | Bal. | 20 | 70 | 63 | 2.82E-07 | α +PRECIPITATION PHASE*** |
| 6 | Cu-30Zn-2P | 32.1 | 1.97 | – | – | Bal. | 17 | 87 | 61 | 2.10E-07 | α +PRECIPITATION PHASE*** |
| 7 | Cu-45Zn-0.2P | 44.7 | 0.18 | – | – | Bal. | 34 | 110 | 106 | 5.88E-07 | β +PRECIPITATION PHASE*** |
| 8 | Cu-45Zn-0.5P | 45.6 | 0.51 | – | – | Bal. | 31 | 117 | 109 | 4.60E-07 | β +PRECIPITATION PHASE*** |
| 9 | Cu-45Zn-0.8P | 45.0 | 0.80 | – | – | Bal. | 26 | 121 | 107 | 2.90E-07 | β +PRECIPITATION PHASE*** |
| 10 | Cu-45Zn-1P | 45.6 | 0.93 | – | – | Bal. | 24 | 118 | 109 | 2.21E-07 | β +PRECIPITATION PHASE*** |
| 11 | Cu-45Zn-1P (FORGING) | 46.8 | 0.97 | – | – | Bal. | 27 | *133 | 113 | 3.64E-07 | β +PRECIPITATION PHASE*** |
| 12 | Cu-45Zn-2P | 45.3 | 1.97 | – | – | Bal. | 20 | 131 | 108 | 4.60E-07 | β +PRECIPITATION PHASE*** |
| 13 | Cu-45Zn-2P (FORGING) | 46.2 | 1.93 | – | – | Bal. | 21 | *139 | 111 | 4.60E-07 | β +PRECIPITATION PHASE*** |
| 14 | Cu-45Zn-2Mn-1P | 46.4 | 0.91 | 1.62 | – | Bal. | 33 | 119 | 112 | 3.80E-07 | β +PRECIPITATION PHASE*** |
| 15 | Cu-45Zn-1P-1Sn | 44.9 | 0.96 | – | 1.02 | Bal. | 23 | 120 | 107 | 3.10E-07 | β +PRECIPITATION PHASE*** |
| 16 | Cu-45Zn-2Mn-1P-1Sn | 46.5 | 0.90 | 1.45 | 1.01 | Bal. | 29 | 136 | 112 | 2.90E-07 | β +PRECIPITATION PHASE*** |
| 17 | Cu-52Zn-1Mn-1P-1Sn | 51.8 | 0.91 | 0.89 | 1.08 | Bal. | 22 | 195 | 131 | 2.63E-07 | β+γ |
| 18 | Cu-54Zn-1Mn-1P-1Sn | 53.6 | 0.82 | 1.08 | 1.02 | Bal. | 17 | *272 | 138 | 2.26E-07 | β+γ |
| 19 | Cu-30Zn-2Mn | 31.4 | – | 1.51 | – | Bal. | 12 | 54 | 58 | 1.50E-06 | α+β |
| 20 | Cu-30Zn-5Mn | 31.2 | – | 4.73 | – | Bal. | 7 | 67 | 57 | 1.45E-06 | α+β |
| 21 | Cu-45Zn-0.5Mn | 46.4 | – | 0.48 | – | Bal. | 25 | 96 | 112 | 8.00E-07 | β |
| 22 | Cu-45Zn-2Mn | 45.7 | – | 1.75 | – | Bal. | 17 | 111 | 110 | 4.29E-07 | β |
| 23 | Cu-45Zn-5Mn | 45.7 | – | 4.55 | – | Bal. | 12 | 132 | 110 | 4.33E-07 | β |
| 24 | Cu-45Zn-5Mn(FORGING) | 46.4 | – | 4.91 | – | Bal. | 11 | *140 | 112 | 3.80E-07 | β |
| 25 | Cu-45Zn-2Mn-1Sn | 46.0 | – | 1.80 | 1.02 | Bal. | 16 | 124 | 111 | 3.20E-07 | β |
| 26 | Cu-45Zn-2Mn-1Sn (FORGING) | 47.0 | – | 1.69 | 1.03 | Bal. | 16 | *150 | 114 | 3.07E-07 | β |
| 27 | Cu-26Zn-4.2Al-2.2Fe-3Mn(FORGING) | NOT ANALYZED | | | | | 7 | **165 | 39 | 7.97E-07 | α+β |
| 28 | Cu-28Zn-3.2Al-3Mn-0.6Si-1Ni | NOT ANALYZED | | | | | 10 | 206 | 46 | 8.70E-07 | β +PRECIPITATION PHASE** |

*:HBW 10/1000   :HBW 10/3000   *(Cu, Zn)xP   ****Mn5Si3 AND OTHERS

FIG. 3

| No. | COMPONENT SYSTEM | HARDNESS(HBW10/500) | | | | | |
|---|---|---|---|---|---|---|---|
| | | ROOM TEMPERATURE | 150°C | 200°C | 250°C | 300°C | 350°C |
| 1 | Cu-30Zn | 55 | 42 | 40 | 47 | 46 | 39 |
| 2 | Cu-40Zn | 86 | 65 | 65 | 63 | 55 | 34 |
| 3 | Cu-45Zn | 100 | 74 | 72 | 53 | 31 | 19 |
| 4 | Cu-52Zn | 136 | 80 | 80 | 53 | 37 | 19 |
| 5 | Cu-30Zn-1P | 70 | 60 | 57 | 52 | 47 | 40 |
| 6 | Cu-30Zn-2P | 87 | 74 | 72 | 61 | 50 | 40 |
| 7 | Cu-45Zn-0.2P | 110 | 87 | 87 | 69 | 53 | 30 |
| 8 | Cu-45Zn-0.5P | 117 | 100 | 84 | 73 | 58 | 32 |
| 9 | Cu-45Zn-0.8P | 121 | 100 | 87 | 74 | 55 | 34 |
| 10 | Cu-45Zn-1P | 118 | 104 | 96 | 74 | 55 | 34 |
| 11 | Cu-45Zn-1P(FORGING) | *133 | 104 | 94 | 77 | 53 | 28 |
| 12 | Cu-45Zn-2P | 131 | 116 | 100 | 80 | 56 | 35 |
| 13 | Cu-45Zn-2P(FORGING) | *139 | 116 | 96 | 81 | 54 | 30 |
| 14 | Cu-45Zn-2Mn-1P | 119 | 100 | 89 | 68 | 47 | 27 |
| 15 | Cu-45Zn-1P-1Sn | 120 | 121 | 114 | 94 | 64 | 39 |
| 16 | Cu-45Zn-2Mn-1P-1Sn | 136 | 127 | 116 | 93 | 62 | 35 |
| 17 | Cu-52Zn-1Mn-1P-1Sn | 195 | 182 | 150 | 127 | 94 | 64 |
| 18 | Cu-54Zn-1Mn-1P-1Sn | *272 | 225 | 200 | 170 | 139 | 94 |
| 19 | Cu-30Zn-2Mn | 54 | 49 | 50 | 49 | 45 | 45 |
| 20 | Cu-30Zn-5Mn | 67 | 62 | 62 | 61 | 55 | 53 |
| 21 | Cu-45Zn-0.5Mn | 96 | 86 | 83 | 74 | 54 | 29 |
| 22 | Cu-45Zn-2Mn | 111 | 107 | 87 | 80 | 70 | 38 |
| 23 | Cu-45Zn-5Mn | 132 | 127 | 119 | 107 | 87 | 50 |
| 24 | Cu-45Zn-5Mn(FORGING) | *140 | 124 | 116 | 107 | 83 | 50 |
| 25 | Cu-45Zn-2Mn-1Sn | 124 | 119 | 119 | 111 | 100 | 56 |
| 26 | Cu-45Zn-2Mn-1Sn(FORGING) | *150 | 127 | 121 | 114 | 100 | 56 |
| 27 | Cu-26Zn-4.2Al-2.2Fe-3Mn(FORGING) | **165 | – | – | – | – | – |
| 28 | Cu-28Zn-3.2Al-3Mn-0.6Si-1Ni | **206 | – | – | – | – | – |

\*:HBW10/1000
\*\*:HBW10/3000

WEAR-RESISTANT COPPER-ZINC ALLOY AND MECHANICAL DEVICE USING SAME

CROSS REFERENCE TO RELATED APPLICATIONS

This application is a continuation application of International Application No. PCT/JP2018/011817, filed on Mar. 23, 2018, which claims priority to Japanese Patent Application No. 2017-059926, filed on Mar. 24, 2017, the entire contents of which are incorporated by references herein.

BACKGROUND

1. Field

The present disclosure relates to copper-zinc alloys excellent in wear resistance, and more specifically relates to a wear-resistant copper-zinc alloy that exhibits wear resistance even when changes occur on the sliding surface.

2. Description of the Related Art

Copper-zinc alloys such as brass alloys, which are copper alloys containing Zn, are excellent in electrical conductivity and workability. Thus, copper-zinc alloys are used for various parts in electronic products. Among such copper-zinc alloys, there are known particle-dispersed copper-zinc alloys in which wear-resistant particles are dispersed in the matrix phase to improve the wear resistance, in particular, focusing on their mechanical properties.

Japanese Patent Application Publication No. 2002-349573 (Patent Literature 1) discloses a particle-dispersed brass alloy as a copper-zinc alloy used for dynamic pressure bearing sleeves and thrust plates in hard disk drives, in which hard particles formed of compounds made up of Ti and/or Si and iron group metals, such as Fe, Ni, and Co, are dispersed as wear-resistant particles in a brass base material. Patent Literature 1 says that dispersion of hard particles can improve the wear resistance, but that too many hard particles increase aggressive properties against the mate member.

Although the dispersion of hard particles suppresses the progress of wear on the sliding surface, if some of the hard particles drop from the sliding surface and are caught between the sliding surfaces, it would cause serious damage not only to the mate member but to the sliding member itself. To address this problem, also proposed are copper-zinc alloys, such as high strength brass, excellent in wear resistance without involving dispersion of hard particles, in which Al and alloy elements, for example, Fe and Mn, are added to improve the wear-resistance.

Japanese Patent No. 4100583 (Patent Literature 2) discloses a high strength brass based on a component composition containing 0.2 to 3 wt % Al and 15 to 50 wt % Zn, and also containing at least one of 0.1 to 3 wt % Si and 0.1 to 5 wt % Mn.

Japanese Patent Application Publication No. 2003-268514 (Patent Literature 3) discloses a copper-zinc alloy containing, in addition to zinc, 0.5 to 20 wt % or more Sn as the third element to improve the wear resistance. Patent Literature 3 says that a solution treatment to form a supersaturated solid solution containing Sn in a copper-zinc alloy base makes it possible to provide copper-zinc alloys having high strength resulting from solid solution strengthening and being excellent in wear resistance.

SUMMARY

There are known particle-dispersed wear-resistant copper-zinc alloys in which hard particles formed of intermetallic compounds of Si and the like and oxides such as alumina are dispersed in the matrix phase as wear-resistant particles and solid-solution-strengthening wear-resistant copper-zinc alloys which form solid solution containing a third element in the matrix phase. For the former alloys, droped hard particles cause serious damage, which means that the former alloys do not have enough stability against changes on the sliding surface. Thus, in particular, for applications where impacts may be applied, solid-solution-strengthening wear-resistant copper-zinc alloys like the latter alloys may be used.

However, for solid-solution-strengthening wear-resistant copper-zinc alloys, along with the progress of wear, an oxide film is formed on a new surface, but the progress of wear may cause damage to the sliding surface due to biting of part of the oxide film droped from the sliding surface, leading to excessive progress of wear.

The present disclosure has been made in light of the above situation, and an object thereof is to provide a wear-resistant copper-zinc alloy that exhibits wear resistance even when changes occur on the sliding surface.

A wear-resistant copper-zinc alloy according to the present disclosure includes in mass %, 28 to 55% Zn, 0.5 to 2% P, and a balance of Cu and unavoidable impurities, and the wear-resistant copper-zinc alloy has an electrical conductivity of 10 to 33% IACS and a hardness of 3.6[Zn]-55 HBW or more, where [Zn] denotes the Zn content in mass %.

In the above disclosure, the wear-resistant copper-zinc alloy may further include in mass %, 3% or less Mn, and/or 2% or less Sn.

In the above disclosure, the average diameter of intermetallic compound particles may be 5 μm or less.

In the above disclosure, the wear-resistant copper-zinc alloy may include in mass %, 30 to 33% Zn, 0.9 to 2% P, and a balance of Cu and unavoidable impurities, and the wear-resistant copper-zinc alloy may have a metallographic structure having a matrix phase of a single α phase and including a precipitation phase containing intermetallic compound particles the average diameter of which is 5 μm or less.

In the above disclosure, the wear-resistant copper-zinc alloy may include in mass %, 44 to 47% Zn, 0.8 to 1% P, and a balance of Cu and unavoidable impurities, and the wear-resistant copper-zinc alloy may have a metallographic structure having a matrix phase of a single β phase and including a precipitation phase containing intermetallic compound particles the average diameter of which is 5 μm or less.

In the above disclosure, the wear-resistant copper-zinc alloy may include in mass %, 44 to 47% Zn, 0.8 to 1% P, 1 to 1.1% Sn, and a balance of Cu and unavoidable impurities, and the wear-resistant copper-zinc alloy may have a metallographic structure having a matrix phase of a single β phase and including a precipitation phase containing intermetallic compound particles the average diameter of which is 5 μm or less.

In the above disclosure, the wear-resistant copper-zinc alloy may include in mass %, 44 to 47% Zn, 0.8 to 1% P, 1.4 to 2% Mn, 1 to 1.1% Sn, and a balance of Cu and unavoidable impurities, and the wear-resistant copper-zinc alloy may have a metallographic structure having a matrix phase of a single β phase and including a precipitation phase containing intermetallic compound particles the average diameter of which is 5 μm or less.

In the above disclosure, the wear-resistant copper-zinc alloy may include in mass %, 51 to 55% Zn, 0.8 to 1% P, 0.8 to 1.1% Mn, 1 to 1.1% Sn, and a balance of Cu and unavoidable impurities, and the wear-resistant copper-zinc alloy may have a metallographic structure having a matrix phase of a (β+γ) phase and not including a precipitation phase containing intermetallic compound particles.

In addition, a wear-resistant copper-zinc alloy according to the present disclosure includes in mass %, 40 to 55% Zn, 1 to 6% Mn, and a balance of Cu and unavoidable impurities, and the wear-resistant copper-zinc alloy has an electrical conductivity of 10 to 33% IACS and a hardness of 3.6[Zn]-55 HBW or more, where [Zn] denotes the Zn content in mass %.

In the above disclosure, the wear-resistant copper-zinc alloy may further include in mass %, less than 0.5% P, and/or 2% or less Sn.

In the above disclosure, the wear-resistant copper-zinc alloy may include in mass %, 44 to 47% Zn, 1.4 to 2% Mn, 1 to 1.1% Sn, and a balance of Cu and unavoidable impurities, and the wear-resistant copper-zinc alloy may have a metallographic structure having a matrix phase of a single β phase and not including a precipitation phase containing intermetallic compound particles.

In the above disclosure, the wear-resistant copper-zinc alloy may be forged material.

In addition, a mechanical device according to the present disclosure includes a sliding member that is formed of the wear-resistant copper-zinc alloy described above and configured to slide on a slide receiving member.

In the above disclosure, the slide receiving member may be a connecting shaft, and the sliding member may be a radial bearing and/or a thrust bearing, the connecting shaft and the radial bearing and/or the thrust bearing being included in a turbocharger.

The configuration in the present disclosure makes it possible to exhibit wear resistance even when changes occur on the sliding surface.

BRIEF DESCRIPTION OF DRAWINGS

FIG. 1 is a diagram illustrating measurement results of the component composition, hardness, electrical conductivity, and specific wear amount of wear-resistant copper-zinc alloys of examples according to the present disclosure.

FIG. 3 is a diagram illustrating measurement results of the high-temperature hardness of the copper-zinc alloys.

DESCRIPTION OF EMBODIMENTS

Figure 2:
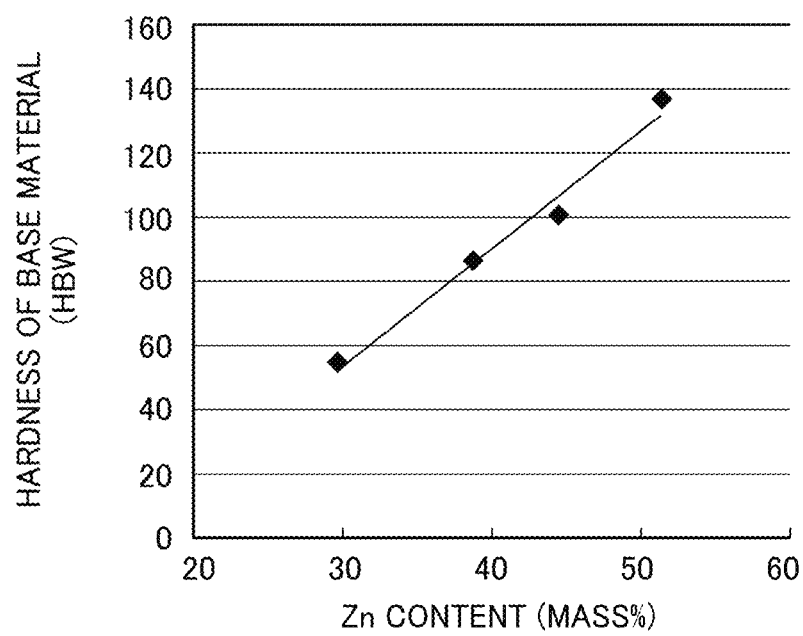
FIG. 2 is a graph illustrating the relationship between the Zn content and the hardness of a base material.

Hereinafter, an embodiment of the present disclosure will be described in detail with reference to the drawings.

A wear-resistant copper-zinc alloy according to the present disclosure includes in mass %, 28 to 55% Zn, 0.5 to 2% P, and a balance of Cu and unavoidable impurities, and the wear-resistant copper-zinc alloy has an electrical conductivity of 10 to 33% IACS and a hardness of 3.6[Zn]-55 HBW or more, where [Zn] denotes the Zn content in mass %. The wear-resistant copper-zinc alloy according to this disclosure mainly suppresses damage caused by droped intermetallic compounds containing P and droped oxides and exhibits wear resistance even when changes occur on the sliding surface.

The alloy composition of this wear-resistant copper-zinc alloy includes in mass %, 28 to 55% Zn, 0.5 to 2% P, and a balance of Cu and unavoidable impurities.

The Zn content is increased because Zn is more inexpensive than Cu. The Zn content is set so that the matrix phase can be an α phase, an (α+β) phase, a β phase, or a (β+γ) phase.

P has an atomic radius much different from those of Cu and Zn, so that forming a solid solution containing P in a matrix phase further increases the material strength. The solid solution containing P in a matrix phase increase the hardness and improves the wear resistance. The P content is within the range of 0.5 to 2% by mass to improve the wear resistance.

The oxide film that can be formed on the surface in production or in use is an oxide of P which is softer than at least alumina. Since the oxides that can be formed on the surface are relatively soft as mentioned above, even when part of the oxide film drops off from the sliding surface along with the progress of wear, damage to the sliding surface due to biting of the droped part of the oxide film is reduced, and excessive progress of wear is reduced, which makes it possible to keep the improved wear resistance.

In the above disclosure, the wear-resistant copper-zinc alloy may further include in mass %, 3% or less Mn, and/or 2% or less Sn. According to this disclosure, this contributes to the wear resistance.

In the above disclosure, the average diameter of intermetallic compound particles may be 5 μm or less. According to this disclosure, this can further reduce the influence of droped intermetallic compounds on the sliding surface and make it easy to exhibit the wear resistance.

In the above disclosure, the wear-resistant copper-zinc alloy may include in mass %, 30 to 33% Zn, 0.9 to 2% P, and a balance of Cu and unavoidable impurities, and the wear-resistant copper-zinc alloy may have a metallographic structure having a matrix phase of a single α phase and including a precipitation phase containing intermetallic compound particles the average diameter of which is 5 μm or less. In this case, the wear-resistant copper-zinc alloy has a lower specific wear amount and thus has further improved wear resistance.

In the above disclosure, the wear-resistant copper-zinc alloy may include in mass %, 44 to 47% Zn, 0.8 to 1% P, and a balance of Cu and unavoidable impurities, and the wear-resistant copper-zinc alloy may have a metallographic structure having a matrix phase of a β single phase and including a precipitation phase containing intermetallic compound particles the average diameter of which is 5 μm or less. In this case, the wear-resistant copper-zinc alloy has a lower specific wear amount and thus has further improved wear resistance.

In the above disclosure, the wear-resistant copper-zinc alloy may include in mass %, 44 to 47% Zn, 0.8 to 1% P, 1 to 1.1% Sn, and a balance of Cu and unavoidable impurities, and the wear-resistant copper-zinc alloy may have a metallographic structure having a matrix phase of a β single phase and including a precipitation phase containing intermetallic compound particles the average diameter of which is 5 μm or less. In this case, the wear-resistant copper-zinc alloy has a lower specific wear amount and thus has further improved wear resistance.

In the above disclosure, the wear-resistant copper-zinc alloy may include in mass %, 44 to 47% Zn, 0.8 to 1% P, 1.4 to 2% Mn, 1 to 1.1% Sn, and a balance of Cu and unavoidable impurities, and the wear-resistant copper-zinc alloy may have a metallographic structure having a matrix phase of a β single phase and including a precipitation phase containing intermetallic compound particles the average diameter of which is 5 μm or less. In this case, the wear-resistant copper-zinc alloy has a lower specific wear amount and thus has further improved wear resistance.

In the above disclosure, the wear-resistant copper-zinc alloy may include in mass %, 51 to 55% Zn, 0.8 to 1% P, 0.8 to 1.1% Mn, 1 to 1.1% Sn, and a balance of Cu and unavoidable impurities, and the wear-resistant copper-zinc alloy may have a metallographic structure having a matrix phase of a (β+γ) phase and not including a precipitation phase containing intermetallic compound particles. In this case, the wear-resistant copper-zinc alloy has a lower specific wear amount and thus has further improved wear resistance. The alloy also has higher hardness, and thus the material has higher mechanical strength. In addition, since the metallographic structure does not include a precipitation phase containing intermetallic compound particles, it is possible to further decrease the influence on the sliding surface, of the intermetallic compound particles droped along with the progress of wear.

In addition, a wear-resistant copper-zinc alloy according to the present disclosure includes in mass %, 40 to 55% Zn, 1 to 6% Mn, and a balance of Cu and unavoidable impurities, and the wear-resistant copper-zinc alloy has an electrical conductivity of 10 to 33% IACS and a hardness of 3.6[Zn]-55 HBW or more, where [Zn] denotes the Zn content in mass %. The wear-resistant copper-zinc alloy according to this disclosure suppresses damage caused by droped Mn oxides and exhibits wear resistance even when changes occur on the sliding surface.

The alloy composition of this wear-resistant copper-zinc alloy includes in mass %, 40 to 55% Zn, 1 to 6% Mn, and a balance of Cu and unavoidable impurities.

For this wear-resistant copper-zinc alloy, forming a solid solution containing Mn in a matrix phase increases the hardness and improves the wear resistance. Also, in the case of using Mn instead of P as the third element, the Mn content is within the range of 1 to 6% by mass from the viewpoint of improving the specific wear amount, as in the case of using P. Here, in the case where the Zn content is approximately 30% by mass, the specific wear amount remains large, even if Mn is added, unlike the case of using P. Thus, in the case of adding Mn as the third element, the Zn content is set to be within the range of 40 to 55% by mass.

The oxide film that can be formed on the surface in production or in use is an oxide of Mn which is softer than at least alumina. Since the oxides that can be formed on the surface are relatively soft as mentioned above, even when part of the oxide film drops off from the sliding surface along with the progress of wear, damage to the sliding surface due to biting of the droped part of the oxide film is reduced, and excessive progress of wear is reduced, which makes it possible to keep the improved wear resistance.

In the above disclosure, the wear-resistant copper-zinc alloy may further include in mass %, less than 0.5% P, and/or 2% or less Sn. According to this disclosure, this contributes to the wear resistance.

In the above disclosure, the alloy composition of the wear-resistant copper-zinc alloy may include in mass %, 44 to 47% Zn, 1.4 to 2% Mn, 1 to 1.1% Sn, and a balance of Cu and unavoidable impurities, and may not include a precipitation phase containing intermetallic compound particles. In this case, the wear-resistant copper-zinc alloy has a smaller specific wear amount and thus has further improved wear resistance. In addition, since the metallographic structure does not include a precipitation phase containing intermetallic compound particles, it is possible to further decrease the influence on the sliding surface, of intermetallic compound particles droped along with the progress of wear.

In the wear-resistant copper-zinc alloy of the above disclosure, the electrical conductivity can be an indicator for the amount of the third element (P or Mn) and other additional elements to be contained in the solid solution to improve the wear resistance relative to a binary copper-zinc alloy which is a base material containing an identical amount of Zn, and the electrical conductivity is within the range of 10 to 33% IACS.

In addition, to obtain the wear resistance in the wear-resistant copper-zinc alloy of the above disclosure, the hardness may be higher than or equal to that of the base material. Specifically, the hardness is 3.6[Zn]-55 (HBW) or more, where [Zn] denotes the Zn content in mass %. Note that the hardness is mainly controlled by the amount of the third element and other additional elements described above, to be contained in the solid solution.

In the above disclosure, the wear-resistant copper-zinc alloy may be forged material. Forging improves the mechanical strength of the material without decreasing the wear resistance.

A mechanical device according to the present disclosure include a sliding member that is formed of the foregoing wear-resistant copper-zinc alloy and configured to slide on a slide receiving member formed of alloy steel or the like. The sliding member in the mechanical device according to this disclosure exhibits wear resistance even when changes occur on the sliding surface.

In the above disclosure, the slide receiving member may be a connecting shaft, and the sliding member may be a radial bearing and/or thrust bearing, the connecting shaft and the radial bearing and/or thrust bearing being included in a turbocharger. According to this disclosure, even when changes occur on the sliding surfaces of the radial bearing and thrust bearing in the turbocharger, the wear-resistant copper-zinc alloy exhibits wear resistance.

The wear-resistant copper-zinc alloy of the above disclosure is excellent in seizure resistance, and thus it can be suitably used for a sliding member in a radial bearing, a thrust bearing, or the like in a turbocharger. More specifically, since the wear-resistant copper-zinc alloy of the above disclosure contains P or Mn, which is oxidized more easily than Zn, as the third element, P oxides or Mn oxides, which are soft, formed on the sliding surface improve the seizure resistance.

On the other hand, for example, for binary copper-zinc alloys, Zn oxides formed on the sliding surface decrease the seizure resistance. In the case where a copper-zinc alloy contains Al, Al is preferentially oxidized, forming alumina on the sliding surface. Since alumina is a hard oxide, alumina formed on the sliding surface is easily peeled off during sliding, which tends to cause a seizure. In the case where a copper-zinc alloy contains Mn and Si, and manganese silicides, which are hard particles, are dispersed in a matrix phase, Si is preferentially oxidized, forming silica on the sliding surface. Since silica is a hard oxide, silica formed on sliding surfaces is easily peeled off during sliding, which tends to cause a seizure.

In contrast, the wear-resistant copper-zinc alloy of the above disclosure has an improved seizure resistance because P oxides or Mn oxides, which are softer than alumina or the like, are formed on the sliding surface. Radial bearings, thrust bearings, or the like in a turbocharger are exposed to high temperatures of approximately 150° C. to 350° C. in some cases. The wear-resistant copper-zinc alloy of the above disclosure, which has a high hardness in high temperature and improves the mechanical strength of the material, can be suitably used for radial bearings and thrust bearings in turbochargers.

As has been described, in this disclosure, forming a solid solution containing P or Mn in a matrix phase increase the hardness and improves the wear resistance. In this case, the oxide film that can be formed on the sliding surface in production or in use is formed of P oxides or Mn oxides which are soft. Since the oxides that can be formed on the surface are relatively soft as described above, even when part of the oxide film drops off from the sliding surface along with the progress of wear, the soft oxides reduce damage to the sliding surface due to biting of the droped part of the oxide film and suppress excessive progress of wear. Thus, with the configuration of the above disclosure, the copper-zinc alloy exhibits wear resistance even when changes occur on the sliding surface.

EXAMPLE

Hereinafter, examples of wear-resistant copper-zinc alloys according to the present disclosure will be described with reference to FIG. 1.

As shown in the samples No. 5, 6, 8 to 18, and 22 to 26 in FIG. 1, the wear-resistant copper-zinc alloys in the examples were prepared by forming solid solutions containing P or Mn in a matrix phase of copper-zinc alloys (see the samples No. 1 to 4 for the base materials) containing 28 to 55% Zn by mass. The Zn content was increased because Zn is more inexpensive than Cu, and the contents were set so that the matrix phase could be an α phase, an (α+β) phase, a β phase or a (β+γ) phase. For example, the Zn content was 28 to 55% by mass, typically 30, 40, 45, or 52% by mass.

There is a method to improve wear resistance in which hard oxides or hard intermetallic compounds, typified by alumina having a Vickers hardness of about 1500 HV or more, are dispersed in a matrix phase. However, in the present examples, in order to improve wear resistance, solid solutions were formed containing P or Mn in a matrix phase to increase the hardness. In this case, the oxide film that can be formed in production or in use is formed of P oxides or Mn oxides which are softer than at least alumina. Since the oxides that can be formed on the surface are relatively soft as mentioned above, even when part of the oxide film drops off from the sliding surface along with the progress of wear, damage to the sliding surface due to biting of the droped part of the oxide film is reduced, and excessive progress of wear is reduced, which makes it possible to keep the improved wear resistance.

In addition, P or Mn, which is more easily oxidized than Zn, contained as the third element also suppresses dezincification corrosion.

Further, P has an atomic radius much different from those of Cu and Zn, so that forming a solid solution containing P in a matrix phase further increases the material strength. Note that not only a solid solution contains P in a matrix phase but also P tends to form intermetallic compounds with Cu and Zn, which probably contributes to the improvement of the hardness, but these intermetallic compounds are not positively formed. The intermetallic compounds of P are softer than intermetallic compounds of Si or the like but at least harder than the matrix phase. Thus, in order to reduce the influence on the sliding surface of intermetallic compounds of P droped along with the progress of wear, the average particle diameter of the intermetallic compounds may be 5 μm or less.

The wear-resistant copper-zinc alloys according to the examples have higher wear resistances than at least Cu-26 Zn-4.2 Al-2.2 Fe-3 Mn known as a high strength brass alloy and Cu-28 Zn-3.2 Al-3 Mn-0.6 Si-1 Ni containing hard Mn silicides as wear-resistant particles.

Next, description will be provided for the results of electrical conductivity measurement, hardness measurement, and specific wear amount measurement conducted for copper-zinc alloys having the component composition illustrated in FIG. 1.

Samples were prepared by forming shapes of 77 mm in diameter×160 mm in length by casting, using molten copper-zinc alloys having the component composition shown in No. 1 to 28. For some of those samples (No. 11, 13, 24, 26, and 27), the cast products were formed into 35 mm squares by hot forging.

The electrical conductivity was measured in accordance with JIS Z 0505. For hardness, the Brinell hardness was measured in accordance with JIS Z 2243. Note that the test force used was changed between 500 kgf (4903 N), 1000 kgf (9807 N), 3000 kgf (29420 N) as appropriate.

The specific wear amount was measured in pin-on-ring testing using a Hayama abrasion tester. The dimensions of test pieces were 5 mm×5 mm×25 mm. For the mate members, an SCM 435 material the hardness of which had been adjusted to HRC 50 was used without lubricating oil. The surface pressure was set to 40 kgf/cm$^2$ (392 N/cm$^2$). The circumferential speed was set to 1.0 m/sec. The travel distance was set to 2 km.

As illustrated in FIG. 1, the samples No. 1 to 4, which are copper-zinc alloys formed of two elements of Cu and Zn, are base materials to be compared to other materials. The Zn contents of these samples were 30%, 40%, 45%, and 52% by mass. The results of the specific wear amounts of those samples were $4.40\times10^{-7}$, $7.00\times10^{-7}$, $5.20\times10^{-7}$, and $4.40\times10^{-7}$ mm$^2$/kgf ($4.49\times10^{-8}$, $7.14\times10^{-8}$, $5.30\times10^{-8}$, and $4.49\times10^{-8}$ mm$^2$/N). The specific wear amount was largest in the case where the Zn content was 40%, and the specific wear amount became smaller in both cases of reducing the Zn content to 30% and increasing it to 52%. The electrical conductivity tends to increase with increasing Zn content and changes within the range of 29 to 39% IACS.

As illustrated in FIG. 2, the hardness of the base materials (No. 1 to 4) has a nearly linear relationship with the Zn content, which can be approximated by $$\text{hardness(HBW)}=3.6[\text{Zn}]-55 \quad \text{(formula 1)}$$

where [Zn] denotes the Zn content in mass %.

Of the samples No. 5 to 26, if a sample shows a specific wear amount smaller than the base material containing the same level of Zn content, it can be said that the wear resistance of the sample is improved at least by the third element, P or Mn, or other additional elements. Specifically, the samples No. 5, 6, 8 to 18, and 22 to 26 all exhibited specific wear amounts smaller than the base materials containing the same level of Zn content, and thus have improved wear resistances.

More specifically, of the samples No. 7 to 13 that contain approximately 45% Zn by mass and P as the third element, the sample containing approximately 0.2% P by mass exhibited a specific wear amount of $5.88\times10^{-7}$ mm$^2$/kgf ($6.00\times10^{-8}$ mm$^2$/N), which is larger than that of the base material (No. 3), $5.20\times10^{-7}$ mm$^2$/kgf ($5.30\times10^{-8}$ mm$^2$/N) As the amount of additional P increased, the specific wear amount decreased, and the sample containing approximately 1% P by mass exhibited the smallest specific wear amount, $2.21 \times 10^{-7}$ mm²/kgf ($2.25 \times 10^{-8}$ mm²/N). If the P content increases from this value, the specific wear amount tends to increase. In other words, the P content within the range of 0.5 to 2% by mass increases the wear resistance.

For the samples No. 5 and 6 which contain approximately 30% Zn by mass and P as the third element, the sample No. 5 containing approximately 1% P by mass exhibited a specific wear amount of $2.82 \times 10^{-7}$ ($2.88 \times 10^{-8}$ mm²/N), and the sample No. 6 containing approximately 2% P by mass exhibited a specific wear amount of $2.10 \times 10^{-7}$ mm²/kgf ($2.14 \times 10^{-8}$ mm²/N), both of which are smaller than that of the base material (No. 1), $4.40 \times 10^{-7}$ mm²/kgf ($4.49 \times 10^{-8}$ mm²/N). In other words, also in the case where the Zn content is approximately 30% by mass, inclusion of P as the third element improves the wear resistance.

In addition, Mn or Sn may be further added as other additives. As the samples No. 14 to 16 indicate, further inclusion of Mn or Sn decreases the specific wear amount compared to the base material No. 3. In this case, the Mn content is set to 3% by mass or less, and the Sn content is set to 2% by mass or less.

Further, as the samples No. 17 and 18 indicate, in the case where the Zn contents are approximately 52% by mass and approximately 54% by mass, the inclusion of P, Mn and Sn makes the specific wear amounts smaller than that of the base material No. 4, $4.40 \times 10^{-7}$ mm²/kgf ($4.49 \times 10^{-8}$ mm²/N). From the above results, the Zn content with which addition of P as the third element decreases the specific wear amount is within the range of 28 to 55% by mass.

Also, in the case of using Mn as the third element instead of P, from the viewpoint of improving the specific wear amount as in the case of P, the Mn content should be within the range of 1 to 6% by mass from the results of No. 21 to 24. Here, the results of No. 19 and 20 indicate that in the case where the Zn content is approximately 30% by mass, addition of Mn as the third element makes the specific wear amount larger than that of the base material No. 1 unlike the case of P. From this result, in the case of adding Mn as the third element, the Zn content should be within the range of 40 to 55% by mass.

In addition, in the case of using Mn as the third element, P or Sn may be further added as other additives. As the samples No. 25 and 26 indicate, further inclusion of Sn makes the specific wear amount smaller than that of the base material No. 3 the Zn content of which is approximately 45% by mass. P may also be added. In this case, the content of Sn should be 2% by mass or less. Here, the content of P should be less than 0.5% by mass in order to avoid the duplication of the P content in the case of using P as the third element as described above.

Comparison between the samples No. 11, 13, 24, and 26, which are forged materials and the samples No. 10, 12, 23, and 25, which are cast materials shows that the forged materials have specific wear amounts at the same level as for those of the cast materials but tend to have higher hardnesses than the cast materials. In other words, forging improves the mechanical strength of materials without decreasing the wear resistance.

The samples No. 5, 6, 8 to 18, and 22 to 26 described above have electrical conductivities of 11 to 33% IACS. These results show that the electrical conductivity tend to decrease as the P, Mn, or Sn content increases. Hence, the electrical conductivity can be an indicator to make the P, Mn, and Sn content within the above range, in other words, an indicator of the amount of the third element or other additional elements contained in the solid solution to improve the wear resistance relative to the base material. Thus, the electrical conductivity should be within the range of 10 to 33% IACS.

A higher hardness does not directly mean a higher wear resistance, but it in general contributes to improvement of wear resistance. For example, the sample No. 21 has a hardness of 96 HBW, which is lower than the estimated base-material hardness (formula 1), 112 HBW, and exhibited a specific wear amount larger than the base material No. 3. This is probably because not only the hardness improvement due to Mn contained in the solid solution was small but also dispersion of the heat history or the like decreased the hardness because the sample No. 21 was an as-cast product, and this lower hardness decreased the wear resistance. Thus, to obtain an enough wear resistance, a hardness higher than or equal to the estimated base-material hardness determined from the Zn content using formula 1 is needed. Hence, the hardness should be 3.6[Zn]-55 (HBW) or more, where [Zn] denotes the Zn content in mass %. Note that the hardness is mainly controlled by the amount of the third element and other additional elements described above, to be contained in the solid solution.

When a solid solution is formed containing P in a matrix phase, part of it tends to be precipitated and form intermetallic compounds. The hardness is probably affected by the amount of such intermetallic compounds, the diameters of the intermetallic compounds, and other factors. Thus, it can be said that not only the amount contained in the solid solution but also the intermetallic compounds control the hardness. Here, those intermetallic compounds are not formed positively as mentioned above.

The sample No. 27 is what is called a high strength brass alloy and is a forged material specified in JIS H 5120 as CAC303. The specific wear amount of the sample was $7.97 \times 10^{-7}$ mm²/kgf ($8.13 \times 10^{-8}$ mm²/N). Compared to this sample, the above samples No. 5, 6, 8 to 18, and 22 to 26 all exhibited relatively small specific wear amounts, and thus these samples have higher wear resistances.

The sample No. 28 is a high strength brass in which Mn and Si are added so that manganese silicides, which are hard particles, are dispersed in a matrix phase as wear-resistant particles. The specific wear amount of the sample was $8.70 \times 10^{-7}$ mm²/kgf ($8.87 \times 10^{-8}$ mm²/N). Compared to this sample, the above samples No. 5, 6, 8 to 18, and 22 to 26 all exhibited relatively small specific wear amounts, and thus these samples have higher wear resistances.

Next, the metallographic structures of the copper-zinc alloys having the component composition shown in FIG. 1 were observed with an optical microscope. The metallographic structure observation results of the copper-zinc alloys are shown in FIG. 1. The metallographic structure of the sample No. 1 had a matrix phase of a single $\alpha$ phase. The metallographic structure of the sample No. 2 had a matrix phase of an ($\alpha+\beta$) phase. The metallographic structure of the sample No. 3 had a matrix phase of a single $\beta$ phase. The metallographic structure of the sample No. 4 had a matrix phase of a ($\beta+\gamma$) phase.

The metallographic structure of the samples No. 5 and 6 had a matrix phase of a single $\alpha$ phase and included a precipitation phase containing particles of intermetallic compounds $(Cu, Zn)_x P$ the average diameters of which were 5 μm or less. The metallographic structure of the samples No. 7 to 16 had a matrix phase of a single R phase and included a precipitation phase containing particles of intermetallic compounds $(Cu, Zn)_x P$ the average diameters of which were 5 μm or less. The metallographic structure of the samples No. 17 and 18 has a matrix phase of a (β+γ) phase and did not include a precipitation phase containing intermetallic compound particles.

The metallographic structure of the samples No. 19 and 20 has a matrix phase of an (ca+) phase and did not include a precipitation phase containing intermetallic compound particles. The metallographic structure of the samples No. 21 to 26 had a matrix phase of a single β phase and did not include a precipitation phase containing intermetallic compound particles.

The metallographic structure of the sample No. 27 had a matrix phase of an (α+β) phase and did not include a precipitation phase containing intermetallic compound particles. The metallographic structure of the sample No. 28 had a matrix phase of a single β phase and included a precipitation phase containing particles of intermetallic compounds $Mn_5Si_3$ and others.

Next, the high-temperature hardness of the copper-zinc alloys having the component composition shown in FIG. 1 was measured. For the high-temperature hardness, the Brinell hardness was measured in accordance with JIS Z 2243 as in the above hardness measurement. Note that the test force was 500 kgf (4903 N). The test temperatures were 150° C., 200° C., 250° C., 300° C., and 350° C.

FIG. 3 is a diagram showing the high-temperature hardness measurement results for the copper-zinc alloys. Note that FIG. 3 also includes the room-temperature hardnesses of the copper-zinc alloys shown in FIG. 1. The samples No. 5 and 6 tended to have higher high-temperature hardnesses than the copper-zinc alloy No. 1 of the base material. The samples No. 8 to 16 tended to have higher high-temperature hardnesses than the copper-zinc alloy No. 3 of the base material. The samples No. 17 and 18 tended to have higher high-temperature hardnesses than the copper-zinc alloy No. 4 of the base material. The samples No. 22 to 26 tended to have higher high-temperature hardnesses than the copper-zinc alloy No. 3 of the base material. It was found from these results that for the wear-resistant copper-zinc alloys in these examples, forming a solid solution containing P or Mn in a matrix phase increases the high-temperature hardness.

In addition, of the samples No. 5, 6, 8 to 18, and 22 to 26 in these examples, the samples No. 5, 6, 9 to 11, 15 to 18, and 25 to 26 all exhibited smaller specific wear amounts. Thus, these samples have higher wear resistances.

To be more specific, from the result that the samples No. 5 and 6 exhibited smaller specific wear amounts among the above samples, it was found that a wear-resistant copper-zinc alloy may include in mass %, 30 to 33% Zn, 0.9 to 2% P, and a balance of Cu and unavoidable impurities, and have a metallographic structure having a matrix phase of a single α phase and including a precipitation phase containing intermetallic compound particles the average diameter of which is 5 μm or less.

From the result that the samples No. 9 to 11 exhibited smaller specific wear amounts among the above samples, it was found that a wear-resistant copper-zinc alloy may include in mass %, 44 to 47% Zn, 0.8 to 1% P, and a balance of Cu and unavoidable impurities, and have a metallographic structure having a matrix phase of a single β phase and including a precipitation phase containing intermetallic compound particles the average diameter of which is 5 μm or less.

From the result that the sample No. 15 exhibited a smaller specific wear amount among the above samples, it was found that a wear-resistant copper-zinc alloy may include in mass %, 44 to 47% Zn, 0.8 to 1% P, 1 to 1.1% Sn, and a balance of Cu and unavoidable impurities, and have a metallographic structure having a matrix phase of a single R phase and including a precipitation phase containing intermetallic compound particles the average diameter of which is 5 μm or less.

From the result that the sample No. 16 exhibited a smaller specific wear amount among the above samples, it was found that a wear-resistant copper-zinc alloy may include in mass %, 44 to 47% Zn, 0.8 to 1% P, 1.4 to 2% Mn, 1 to 1.1% Sn, and a balance of Cu and unavoidable impurities, and have a metallographic structure having a matrix phase of a single β phase and including a precipitation phase containing intermetallic compound particles the average diameter of which is 5 μm or less.

From the result that the samples No. 17 and 18 exhibited smaller specific wear amounts among the above samples, it was found that a wear-resistant copper-zinc alloy may include in mass %, 51 to 55% Zn, 0.8 to 1% P, 0.8 to 1.1% Mn, 1 to 1.1% Sn, and a balance of Cu and unavoidable impurities, and have a metallographic structure having a matrix phase of a (β+γ) phase and not including a precipitation phase containing intermetallic compound particles. It was also found the samples No. 17 and 18 tend to have higher hardnesses than the samples No. 5, 6, 9 to 11, 15, and 16.

From the result that the samples No. 25 and 26 exhibited smaller specific wear amounts among the above samples, it was found that a wear-resistant copper-zinc alloy may include in mass %, 44 to 47% Zn, 1.4 to 2% Mn, 1 to 1.1% Sn, and a balance of Cu and unavoidable impurities, and have a metallographic structure having a matrix phase of a single β phase and not including a precipitation phase containing intermetallic compound particles.

Next, the seizure resistance of some of the copper-zinc alloys having the component composition shown in FIG. 1 was evaluated. The samples No. 10 and 23 were used as the wear-resistant copper-zinc alloys in these examples. The samples No. 1, 3, and 7 were used as copper-zinc alloys of comparative examples. In addition, an alloy of Cu-30% Zn by mass-3% Al by mass (No. 29) and an alloy of Cu-45% Zn by mass-2% Mn by mass-0.6% Si by mass (No. 30) were also evaluated as copper-zinc alloys of comparative examples.

Figure 4:
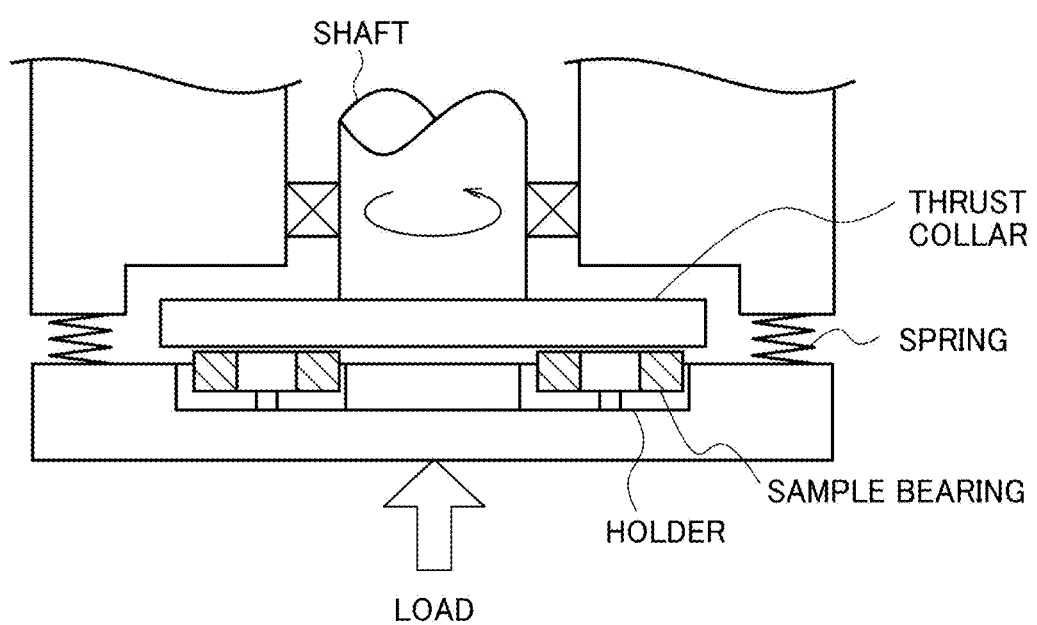
FIG. 4 is a schematic diagram for explaining a seizure resistance testing method.

First, description will be provided for the method of evaluating the seizure resistance. A high-speed bearing friction tester was used as test equipment. FIG. 4 is a schematic diagram for explaining the seizure resistance testing method. As illustrated in FIG. 4, a thrust collar is disposed to face sample bearings to apply a thrust load to the sample bearings. The sample bearing was a test piece having a disk shape with a hole at the center. The sample bearings were disposed at four places on the holder in a circumferential direction. The bearing load was applied from the back of the sample bearings with a hydraulic cylinder, and the load was increased stepwise. A sudden rise in temperature and a sudden rise in torque during testing were judged to be seizing, and the surface pressure of the bearings at the time of seizing was determined as the seizure surface pressure. The bearing surface pressure was increased by 0.03 MPa every three minutes. For the lubricating oil, an engine oil (SAE10W-30) was used. The material of the thrust collar was chromium molybdenum steel (SCM435). The number of revolutions per minute of the shaft was set to approximately 25,000 rpm.

Figure 5:
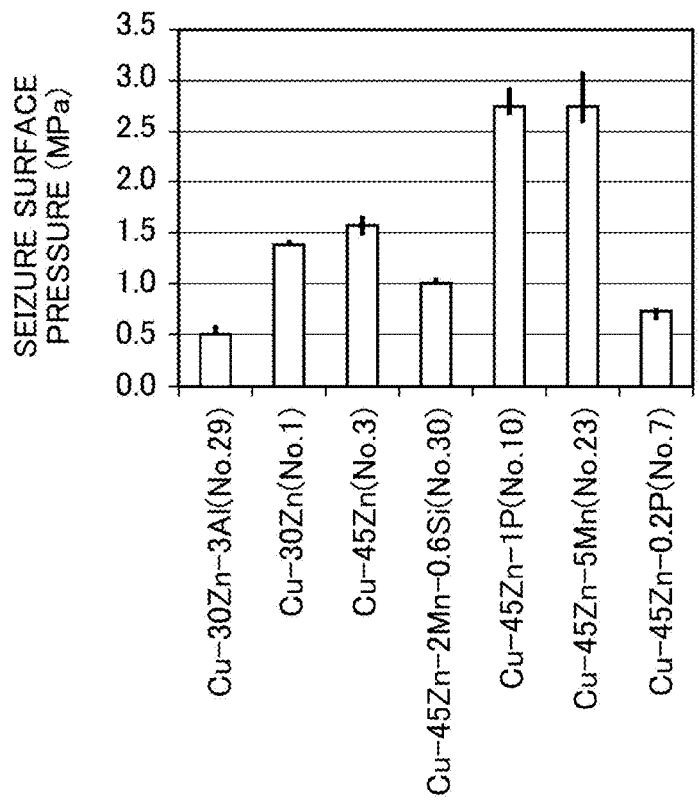
FIG. 5 is a graph illustrating test results of seizure resistance.

Next, the seizure resistance test results will be described. FIG. 5 is a graph showing the seizure resistance test result. In the graph of FIG. 5, the horizontal axis indicates the types of copper-zinc alloys, the vertical axis indicates the seizure surface pressure, and the seizure surface pressure of each copper-zinc alloy is shown with a bar graph. A higher seizure surface pressure means a better seizure resistance. Note that the seizure surface pressure of each copper-zinc alloy was determined from the average of those of the four sample bearings.

For the seizure surface pressures of the copper-zinc alloys of the comparative examples, the sample No. 1 exhibited approximately 1.4 MPa. The sample No. 3 exhibited approximately 1.6 MPa. The sample No. 7 exhibited approximately 0.7 MPa. The sample No. 29 exhibited approximately 0.5 MPa. The sample No. 30 exhibited approximately 1.0 MPa. Compared to these results, for the wear-resistant copper-zinc alloys in these examples, the sample No. 10 exhibited approximately 2.7 MPa. The sample No. 23 exhibited approximately 2.7 MPa. The seizure surface pressures of the wear-resistant copper-zinc alloys No. 10 and 23 are higher than those of the copper-zinc alloys No. 1, 3, 7, 29 and 30. From these results, it has become clear that the wear-resistant copper-zinc alloys in these examples are excellent in seizure resistance.

As has been described above, the wear-resistant of the material is improved relative to the base materials formed of two elements, Cu and Zn, by adding a specified amount of P as the third element to a copper-zinc alloy containing 28 to 55% Zn by mass to form a solid solution, by adding a specified amount of Mn as the third element to a copper-zinc alloy containing 40 to 55% Zn by mass to form a solid solution, or by further adding a specified amount of some other additive elements. The main reason for this is probably because forming a solid solution containing the third element in a matrix phase increased the hardness, which improved the wear-resistant.

In addition, since the alloy contains P orMnbut does not contain Si, the oxide film that can be formed on the new surface along with the progress of wear does not contain Si oxides, and thus the oxides that form the oxide film are softer than alumina. Damage to the sliding surface due to biting of the oxide film droped from the sliding surface was reduced and excessive progress of wear was suppressed probably because the oxides that can be formed on the surfaces were relatively soft as just mentioned. In summary, the copper-zinc alloys of these examples probably exhibited wear resistance even when changes occurred on the sliding surface, and as a result, the wear resistance was higher than those of the high strength brasses (see No. 27 and 28) which are conventional materials. Also, the aggressive property of the copper-zinc alloys in these examples against the mate member is low.

In particular, in the case where P was added as the third element, intermetallic compounds the diameters of which were 5 μm or less were observed. However, even if such intermetallic compounds are droped by wear, damage to the sliding surface due to biting of intermetallic compounds can be suppressed probably not only because the diameters are small but also because they are relatively soft. Thus, those copper-zinc alloys can probably also exhibit wear resistances.

Note that although the copper-zinc alloys in these examples were obtained by casting or forging the cast product as described above and were not heat-treated, a heat treatment may be performed on the copper-zinc alloys as needed.

Figure 6:
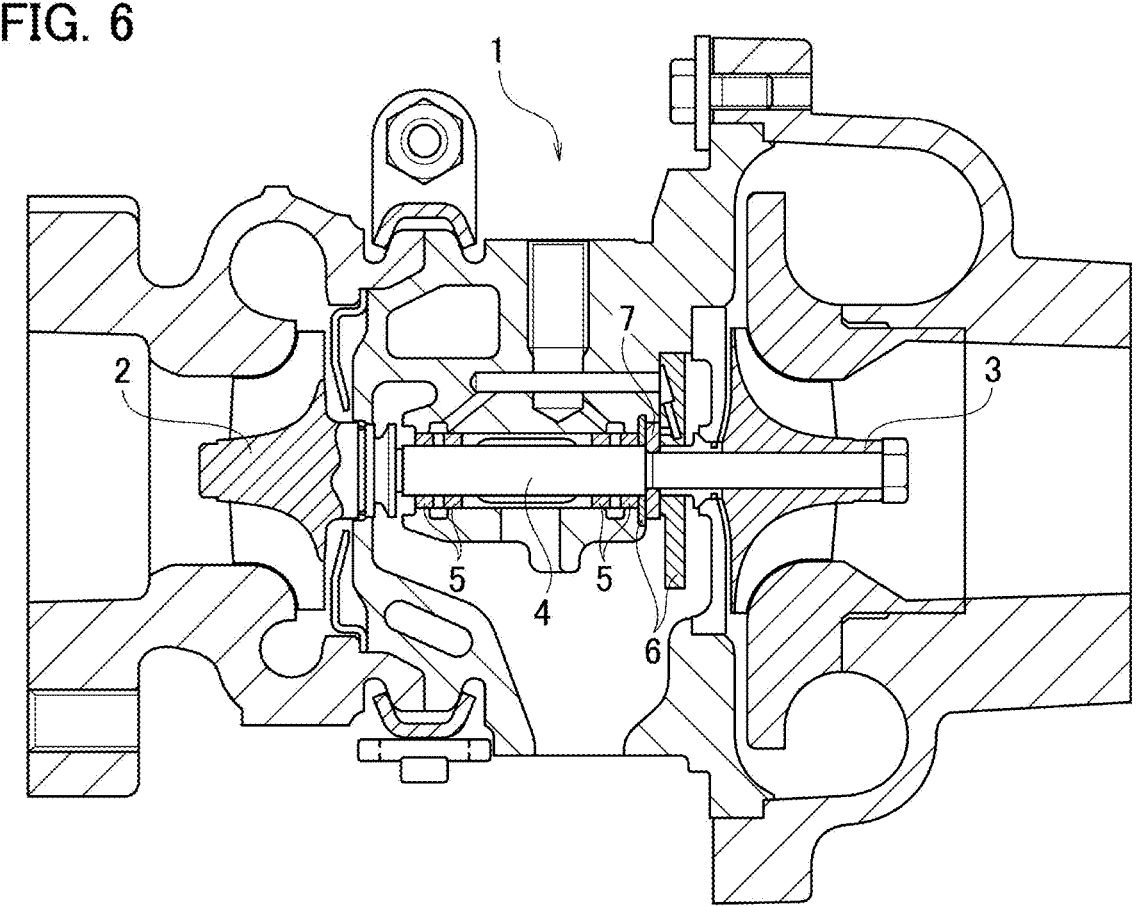
FIG. 6 is a cross-sectional view of a turbocharger which is a mechanical device as an application example of the wear-resistant cupper alloys.

The copper-zinc alloys in these examples exhibit wear resistance in the case these copper-zinc alloys are used for sliding members that slide on slide receiving members in mechanical devices having sliding portions, such as rotary machines. For example, as illustrated in FIG. 6, the copper-zinc alloys in these can be used for a radial bearing (floating metal) 5 (sliding member) and/or a thrust bearing 6 (sliding member) which slide on a shaft 4 (slide receiving member) connecting a turbine impeller 2 and a compressor impeller 3 in a turbocharger 1 as a mechanical device. In particular, in high-speed sliding as the radial bearing 5 and the thrust bearing 6 in the turbocharger 1, the hardness of the material does not directly affect the wear-resistant as described above. Since for the copper-zinc alloys in these examples, oxides that can be formed on the surface are relatively soft, the copper-zinc alloys in these example exhibit wear resistance.

Although examples and modifications based on the examples, according to the present disclosure have been described as above, the present disclosure is not limited to these examples and modifications. Those skilled in the art can find various alternative examples and modifications without departing from the substance of the present disclosure and the attached claims. For example, for the component composition of the alloys, additional alloy components may be added to obtain additional effects as far as the features of the present disclosure are not lost.

Since the wear-resistant copper-zinc alloy of the present disclosure exhibits wear resistance even when changes occur on the sliding surface, it is useful for radial bearings and/or thrust bearings in turbochargers.

What is claimed is:
1. A copper-zinc alloy consisting of, in mass %:
40 to 55% Zn;
1 to 6% Mn;
more than 0% and less than 0.5% P; and/or more than 0% and 2% or less Sn; and
a balance of Cu and unavoidable impurities, wherein
the copper-zinc alloy has an electrical conductivity of 10 to 33% IACS and a hardness of 3.6[Zn]-55 HBW or more, where [Zn] denotes to Zn content in mass %.

* * * * *